(12) United States Patent
Wig et al.

(10) Patent No.: US 9,660,364 B2
(45) Date of Patent: May 23, 2017

(54) SYSTEM INTERCONNECT FOR INTEGRATED CIRCUITS

(71) Applicant: INTEL CORPORATION, Santa Clara, CA (US)

(72) Inventors: Timothy Wig, Northborough, MA (US); Todd Hinck, Arlington, MA (US); Sanka Ganesan, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 255 days.

(21) Appl. No.: 14/055,506

(22) Filed: Oct. 16, 2013

(65) Prior Publication Data

US 2014/0106582 A1 Apr. 17, 2014

Related U.S. Application Data

(60) Provisional application No. 61/714,871, filed on Oct. 17, 2012.

(51) Int. Cl.
| | |
|---|---|
| *H05K 1/18* | (2006.01) |
| *H01R 12/53* | (2011.01) |
| *H04L 12/40* | (2006.01) |
| *H04B 1/3883* | (2015.01) |
| *H01R 12/72* | (2011.01) |
| *H01R 31/06* | (2006.01) |
| *H04B 15/04* | (2006.01) |

(52) U.S. Cl.
CPC ............ *H01R 12/53* (2013.01); *H04B 1/3883* (2013.01); *H04L 12/40013* (2013.01); *H01R 12/721* (2013.01); *H01R 31/06* (2013.01); *H04B 15/04* (2013.01)

(58) Field of Classification Search
CPC ............ G06F 1/184–1/187; G06F 1/18; G06F 13/409; G06F 13/4081
USPC ........ 361/775–777, 790, 788, 803, 760–764, 361/724–728
See application file for complete search history.

(56) References Cited

U.S. PATENT DOCUMENTS

| | | | | |
|---|---|---|---|---|
| 5,507,650 A | * | 4/1996 | Larabell ................. | G06F 1/184 439/61 |
| 6,098,127 A | * | 8/2000 | Kwang ................ | H01R 31/005 361/679.4 |
| 6,667,891 B2 | * | 12/2003 | Coglitore ................ | G06F 1/184 361/784 |
| 6,743,054 B2 | * | 6/2004 | Wu ....................... | G11B 33/122 439/61 |
| 6,859,854 B2 | * | 2/2005 | Kwong ................ | G06F 3/0607 361/679.33 |

(Continued)

OTHER PUBLICATIONS

Molex Connector Part No. 46720-0011, www.molex.com/molex/products/datasheet.jsp?part=active/0467200011_EDGE_CARD_CONNECTO.xml, reviewed online on May 22, 2015, 44 pages.

*Primary Examiner* — Tuan T Dihn
(74) *Attorney, Agent, or Firm* — International IP Law Group, P.L.L.C.

(57) ABSTRACT

An electronic device for transmitting data is described herein. In some examples, the electronic device includes a package substrate, and a plurality of integrated circuits to be coupled to the package substrate, at least one integrated circuit comprising a topside connector or an edge connector to be coupled to a cable that is to couple to a cable receptacle.

15 Claims, 4 Drawing Sheets

(56) References Cited

U.S. PATENT DOCUMENTS

| | | | |
|---|---|---|---|
| 7,008,234 B1 * | 3/2006 | Brown | H01R 13/518 |
| | | | 439/61 |
| 7,275,935 B2 * | 10/2007 | Chen | G06F 13/409 |
| | | | 361/788 |
| 7,705,447 B2 | 4/2010 | Ganesan et al. | |
| 7,888,784 B2 | 2/2011 | Gurumurthy et al. | |
| 8,508,947 B2 | 8/2013 | Ganesan et al. | |
| 2003/0180006 A1 * | 9/2003 | Loh | G02B 6/4214 |
| | | | 385/88 |
| 2005/0078463 A1 * | 4/2005 | Chheda | G06F 1/189 |
| | | | 361/789 |
| 2007/0097659 A1 * | 5/2007 | Behrens | G06F 1/18 |
| | | | 361/788 |
| 2012/0243160 A1 * | 9/2012 | Nguyen | G06F 1/181 |
| | | | 361/679.08 |
| 2013/0251052 A1 * | 9/2013 | Tang | H04L 25/03878 |
| | | | 375/259 |
| 2014/0217571 A1 | 8/2014 | Ganesan et al. | |
| 2014/0273552 A1 | 9/2014 | Ganesan et al. | |
| 2015/0118870 A1 | 4/2015 | Swaminathan et al. | |

* cited by examiner

200

SYSTEM INTERCONNECT FOR INTEGRATED CIRCUITS

BACKGROUND

Field

This disclosure relates generally to system interconnects, and more specifically, but not exclusively, to a system interconnect that transmits data using a cable attached from a packaged ASIC, such as a computer or router device, to a cabled receptacle.

Description

Computing devices continue to increase the speed at which data is transmitted. In some embodiments, computing devices can transmit data between any suitable number of integrated circuits and components using various system interconnects, such as a universal serial bus, among others. In some examples, computing devices can also transmit data to additional computing devices through various types of connectors and transceivers such as low insertion force connectors, zero insertion force connectors, and card edge connectors. These card edge connectors may include those commonly used for PCI Express, quad small form-factor pluggable transceivers (also referred to herein as QSFP), and CXP, among others. Some connectors may optionally mount active transceiver modules, most commonly supporting optical data communication, within the connector body.

BRIEF DESCRIPTION OF THE DRAWINGS

The following detailed description may be better understood by referencing the accompanying drawings, which contain specific examples of numerous features of the disclosed subject matter.

DESCRIPTION OF THE EMBODIMENTS

Figure 1:
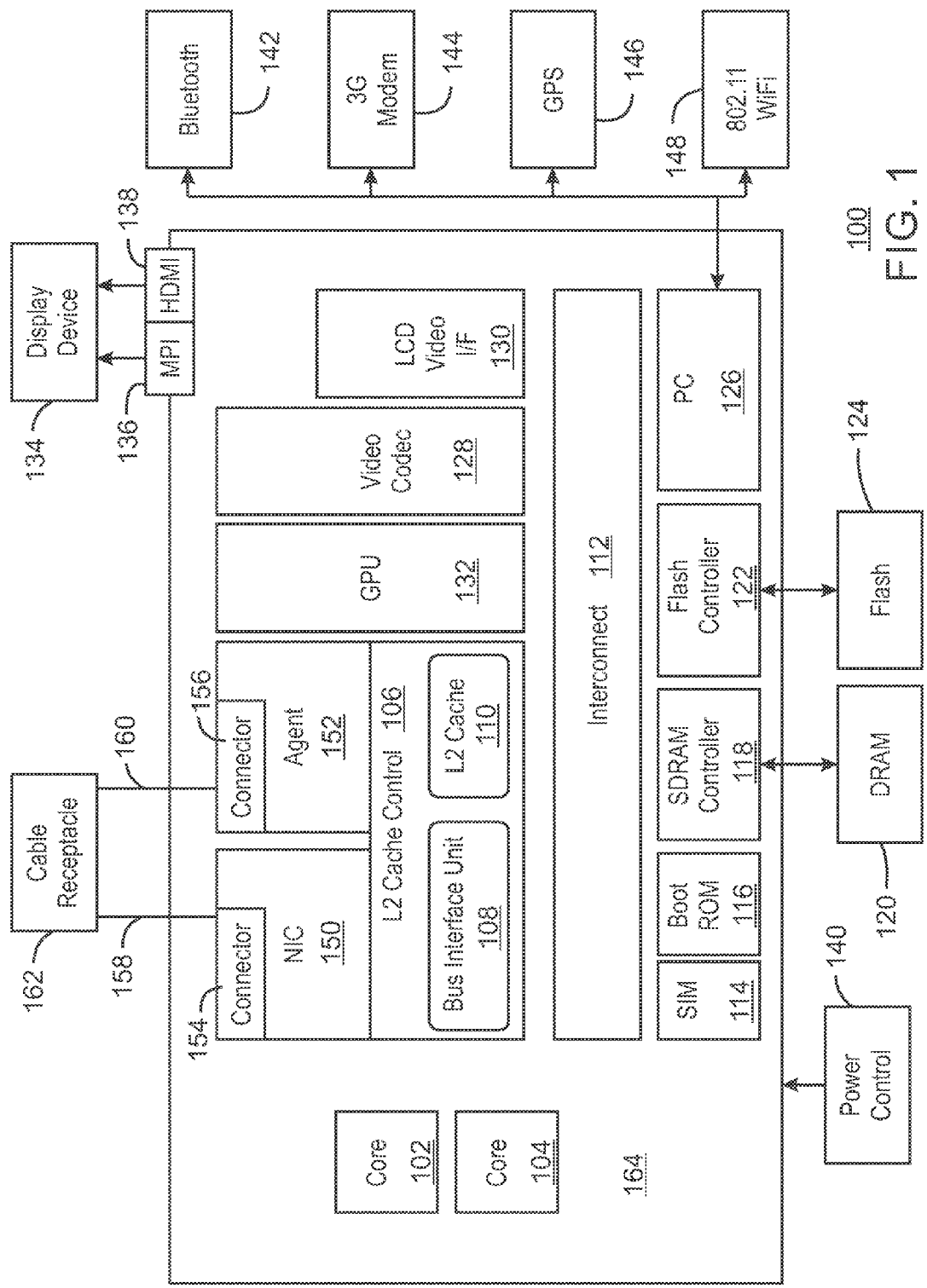
FIG. 1 depicts an example block diagram of a computing device that can transmit data through a topside connector coupled to a cable receptacle.

The enterprise computing ecosystem has grown exponentially as the growth of data needs and computing systems, such as mobile devices, have increased their demand on servers. In some examples, computing systems are requested to transmit data through a switch fabric link that is able to operate at speeds of up to, and potentially beyond, 100 gigatransfers per second (GT/s). Unfortunately, current passive cable and connector interconnect solutions impose physical limitations on maximum board and cable routing lengths. For conventional channel routing, much of the total link loss budget, which can be perhaps 30 dB, may be consumed before the signal reaches an edge of a printed circuit board in a single chassis, precluding external cabled connections to similar, separate chassis. Much of this channel loss is incurred transiting from an integrated circuit through electrical connections within the relatively high-loss package substrate, socket, and printed circuit baseboard. These conventional routes typically sustain appreciable channel-to-channel crosstalk, as well.

According to embodiments of the subject matter discussed herein, a computing device can transmit data using a cable that attaches the top of a packaged ASIC (also referred to herein as an integrated circuit) directly to a cable receptacle. In some embodiments, the integrated circuit can include a processor, dedicated I/O silicon in a multichip package, and the like. The cable receptacle, as referred to herein, can include any suitable electrical coupling device that can accept a connector or transceiver, such as the quad small form-factor pluggable (also referred to herein as QSFP) transceiver, among others. In some embodiments, data can be transmitted directly between an integrated circuit and a cable receptacle without adding the complexity, power, and cost of an electrical repeater. For example, a cable that transmits data between an ASIC/topside connector over a cable to a cable receptacle will eliminate many of the board losses incurred in a traditional channel. A package substrate or printed circuit board, as referred to herein, can include any suitable non-conductive substrate that can electrically connect any suitable number of components using tracks, pads, and other electrical features. A cable that transmits data between an integrated circuit and a cable receptacle without transmitting an electrical signal through the package substrate, a socket, and printed circuit board may experience less data corruption. In some examples, the cable that transmits data directly between an integrated circuit and a cable receptacle can transmit data across farther distances within a computing device or a router platform.

In some embodiments, the cable receptacle can be modified to be a double-ended cable receptacle that can connect to at least two package substrates through appropriate cabling. In some embodiments, the cable receptacle can be modified to be a double-ended, pass-thru cable receptacle that can couple signals from at least two packaged application specific integrated circuits (also referred to herein as ASICs), including ASICs that reside in separate chassis. In some examples, the double-ended cable receptacle can also include any suitable number of sideband signals, and power signals, among others.

FIG. 1 depicts an example block diagram of a computing device that can transmit data through a topside connector coupled to a cable receptacle. The computing device 100 can be any suitable device such as a hand-held phone, smartphone, tablet, ultra-thin notebook, notebook with broadband adapter, or any other computing device. In some examples, the computing device 100 can connect to a base station or node, which can correspond to a mobile station (MS) in a GSM network, among others.

In some embodiments, the computing device 100 can include any suitable number of integrated circuits, such as processors or cores 102 and 104. In some examples, the integrated circuits 102 and 104 may be processors or cores that execute instructions that conform to any suitable Instruction Set Architecture, such as an Intel® Architecture Core™ based processor, an Advanced Micro Devices, Inc. (AMD) processor, a MIPS-based processor, an ARM-based processor design, or a customer thereof, as well as their licensees or adopters. In some embodiments, integrated circuits 102 and 104 are coupled to a cache control 106 that can transmit data using the bus interface unit 108 and L2 cache 110. In some examples, an interconnect 112 includes an on-chip interconnect, such as an advanced microcontroller bus architecture (AMBA), or other suitable interconnect, which can implement one or more aspects of the described techniques.

The interconnect 112 can provide communication channels to other components in the computing device 100. In some embodiments, the other components can include a Subscriber Identity Module (SIM) 114 to interface with a SIM card, a boot ROM 116 to store boot code for execution by cores 102 and 104 to initialize and boot the computing device 100, a SDRAM controller 118 to interface with external memory (e.g. DRAM 120), a flash controller 122 to interface with non-volatile memory (e.g. Flash 124), a peripheral control (also referred to herein as PC) 126 (e.g. Serial Peripheral Interface) to interface with peripherals, video codecs 128 and video interface 130 to display and receive input (e.g. touch enabled input), a GPU 132 to perform graphics related computations, etc. Any of these components may incorporate aspects of the techniques described herein. In some embodiments, the video interface 130 can transmit data to a display device 134 using any suitable protocol or interface such as a MIPI® interface 136 or an HDMI interface 138. The computing device 100 can also electrically couple to a power control 140 that can provide power using any suitable technique. In addition, the computing device 100 can transmit data between the peripheral control 126 and any suitable number of additional peripherals, such as a Bluetooth module 142, 3G modem 144, GPS 146, and WiFi 148. Furthermore, the computing device 100 may also include a radio for communication. In some examples, the computing device 100 may include any suitable combination of the peripheral communication modules discussed above.

In some embodiments, the computing device 100 can also include a network interface controller (also referred to herein as a NIC) 150 or an agent 152. An agent, as referred to herein, can include a network interface controller, switch fabric silicon, and the like. The NIC 150 and the agent 152 can include topside connectors 154 and 156. The topside connectors 154 and 156 can transmit data to any suitable component or computing device through a cable 158 or 160 such as a multi-conductor flex cable, a coaxial cable, or a twin-axial cable, among others and a cable receptacle 162. In some examples, the cable receptacle 162 can attached to cables 158 or 160 that have a QSFP connector, a LIF connector, or a ZIF connector, among others. In some embodiments, the cable receptacle 162 transmits data between components or computing devices and the NIC 150 and agent 152. The cable receptacle 162 is described in greater detail below in relation to FIG. 2. As discussed above, cables 158 or 160 that connect topside connectors 154 or 156 and a cable receptacle 162 may not reside in a package substrate 164 of a computing device 100. Rather, the package substrate 164 may electrically couple the peripheral components and the NIC 150 and agent 154. The package substrate 164 may also include any suitable number of signal lines that can transmit data such as the interconnect 112, among others. In some embodiments, the NIC 150 or agent 152 can electrically couple to a cable 158 or 160 through an edge connector.

Figure 2:
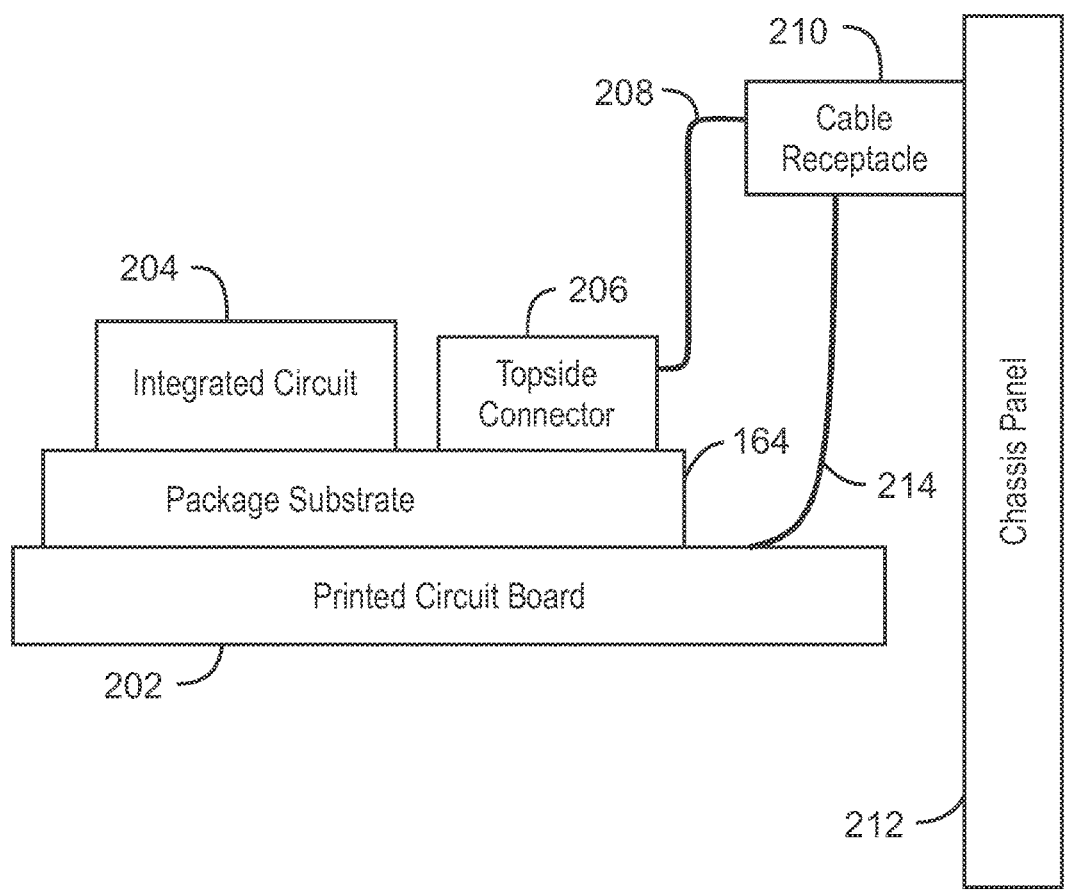
FIG. 2 is an example block diagram of a computing device that can transmit data between a topside connection for an integrated circuit and a cable receptacle.

FIG. 2 is an example block diagram of a computing device that can transmit data between a topside connector for an integrated circuit and a cable receptacle. In some examples, the computing device 200 can include a baseboard (also referred to herein as a baseboard printed circuit board) 202. The baseboard 202 can include any suitable number of electrical features that connect any suitable number of electrical components. In some embodiments, an integrated circuit 164, such as a processor, among others, can be coupled to a packaged ASIC 164. In some examples, the integrated circuit 204 can couple to the packaged ASIC 164 through solder bumps, solder balls, or wire bonding, or a low insertion force connector, among others. The packaged ASIC 164 can include a topside connector 206 that attaches to a flexible cable 208, which connects the integrated circuit 204 to a cable receptacle 210. In some examples, the topside connector 206 can include any suitable number of ports that transmit data through interconnects such as the Intel® Quick Path Interconnect (QPI). In some embodiments, the flexible cable 208 can be a micro-coaxial cable, a twin-axial cable, or a multi-conductor cable, among others. In some examples, the flexible cable 208 can include a flexible printed circuit that is made of polyimide or liquid crystal polymer (LCP), among others. The flexible cable 208 can transmit data by carrying electrical signals between the processor 204 and the cable receptacle 210. In some examples, the cable receptacle 210 can be a double-ended cable receptacle, a QSFP cable receptacle, or a CXP cable receptacle, among others. The double-ended cable receptacle is discussed further below in relation to FIG. 3.

In one embodiment, the cable receptacle may be disposed directly on the baseboard 202. Alternatively, the cable receptacle may also be mounted separate from the baseboard, to a chassis panel 212, for example. In some examples, the chassis panel 212 may be a printed circuit board. In one embodiment, the power and sideband signals could be connected separately, though an additional flexible cable 214, for example.

Figure 3:
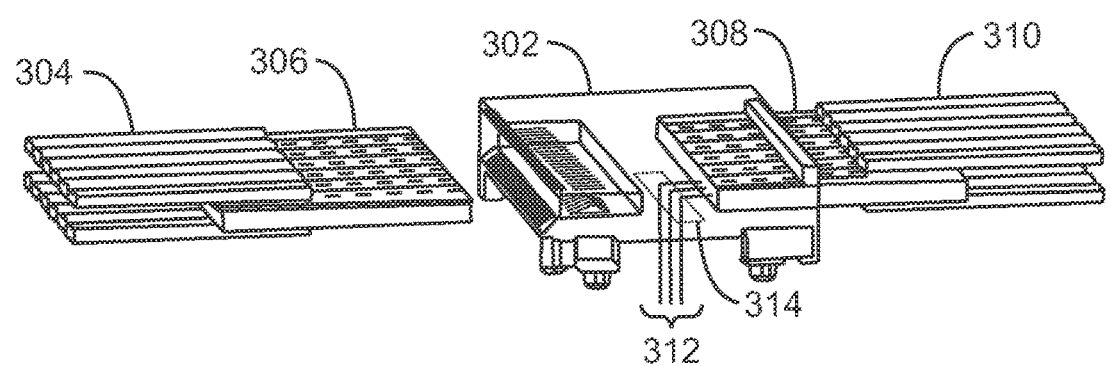
FIG. 3 is a block diagram of a double ended cable receptacle.

FIG. 3 is a block diagram of a double ended cable receptacle. In some embodiments, the double ended cable receptacle 302 can include any suitable number of wires 304 connected to a transition board (also referred to herein as a paddle board) 306. In some examples, the double ended cable receptacle 302 can connect two transition boards 306 and 308. For example, each side of the cable receptacle 302 may enable insertion of transition boards 306 and 308 with attached wires 304 and 310. In some embodiments, the attached wires 304 and 310 may terminate directly onto the transitions boards 306 and 308. The edge of each transition board 306 and 308 may be compatible with any suitable connector, such as a CXP or QSFP connector, among others, and may not have identical geometry at each port. While FIG. 3 shows the transition boards 306 and 308 as collinear, in some embodiments, the transition boards may meet the receptacle 302 at another angle, such as 90 degrees, among others, with respect to one another. The cable receptacle 302 may transmit data between transition boards 306 and 308 using any suitable number of signal lines. In some embodiments, the connector may be housed in a rigid shell that facilitates alignment of the mating interface, dissipates heat, or provides electromagnetic shielding. The double ended cable receptacle 302 can also include additional wires 312 that carry power signals and sideband signals, among others. The power signals and sideband signals may be generated by a platform management chip, a power supply, or an integrated circuit, among others. In some embodiments, the additional wires 312 can transmit a signal that indicates the presence of a device, and the like. The power and sideband signals 312 may exit the connector through a direct connection to a rigid printed circuit board (PCB), or by means of a detachable flexible cable. In some embodiments, the power and sideband signals 312 transmit data through a sideband opening 314 that may reside at the bottom of the double-ended cable receptacle, the top of the double-ended cable receptacle, or any other suitable portion of the double-ended cable receptacle.

Figure 4:
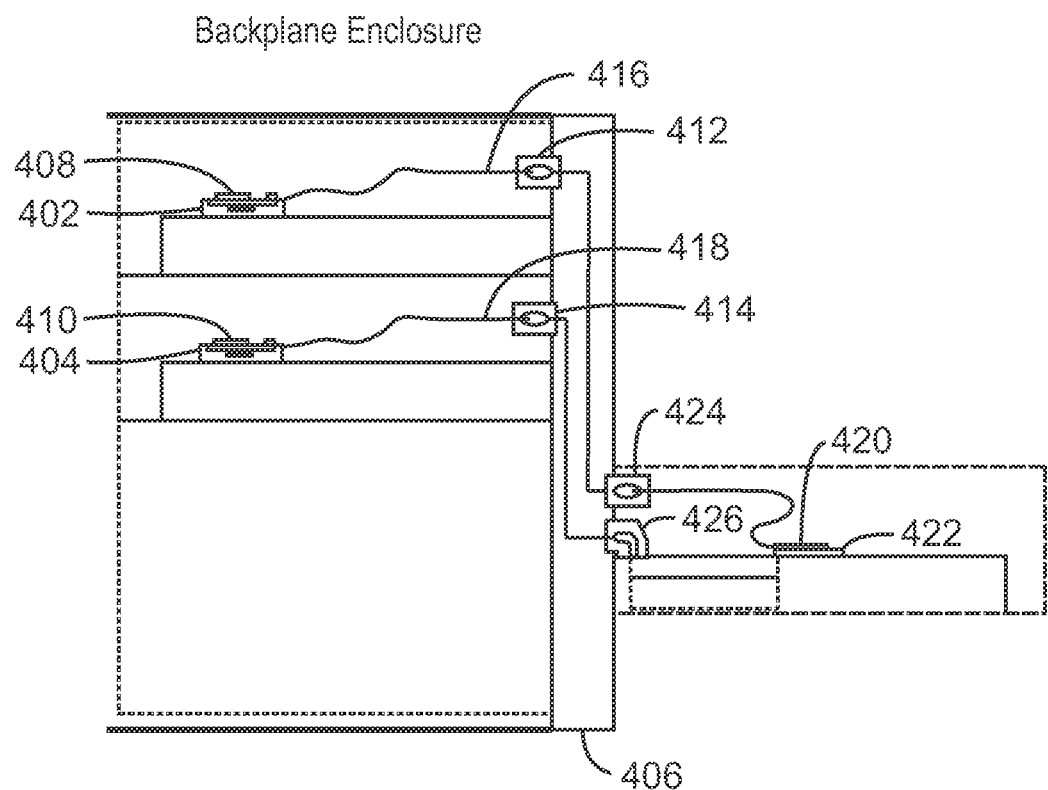
FIG. 4 is a block diagram of an example system that includes a cable receptacle.

FIG. 4 is a block diagram of an example system that includes a cable receptacle. In some embodiments, the system (also referred to herein as a backplane enclosure) 400 can include any suitable number of blade package substrates 402 and 404 electrically coupled to a backplane printed circuit board 406. In some examples, each blade package substrate 402 and 404 can include an integrated circuit 408 and 410 that transmits data to a cable receptacle 412 or 414 through any suitable cable 416 or 418 connected to the topside of an integrated circuit 408 or 410. In some embodiments, a cable 416 or 418 can be a twin-axial cable, a coaxial cable, or a flex cable, among others. The cable 416 or 418 may also connect to a cable receptacle 412 or 414 through a modified connector. For example, a cable 416 or 418 may electrically couple to a cable receptacle 412 or 414 though any suitable connector such as a QSFP connector, ZIF connector, LIF connector, and the like. In some embodiments, a cable 416 or 418 may be coupled to a cable receptacle 412 or 414 through a paddle board (also referred to herein as a transition board), a LIF connector, and a QSFP connector. In some examples, the cable receptacle 412 or 414 can transmit data to switch fabric silicon 420, or any other suitable integrated circuit.

In some embodiments, an integrated circuit 408 may transmit data to switch fabric silicon 420 that is electrically coupled to a router package substrate 422. In some examples, data may be transmitted through the blade package substrate 404 rather than through the cable 418. Furthermore, the backplane printed circuit board 406 may include any suitable number of cable receptacles 412 and 414 that connect to any suitable number of router package substrates 422 through backplane connectors or cable receptacles 424 and 426.

In some embodiments, the integrated circuits 408 and 410 may not transmit data to switch fabric silicon 420 through a backplane printed circuit board 406. Rather, the integrated circuits 408 and 410 may transmit data to cable receptacles 412 and 414. The cable receptacles 412 and 414 may transmit data to cable receptacles 424 and 426 through any suitable network cable, such as coaxial cables, optical fiber cables, and twisted pair cables, among others. Furthermore, in some embodiments, the integrated circuits 408 and 410 can transmit data through cable receptacles 412 and 414 to switch fabric silicon mounted to the backplane printed circuit board 406. The system 400 may not include a repeater to transmit data between the integrated circuits 408 and 410 and switch fabric silicon 420.

EXAMPLE 1

An electronic device that can transmit data is described herein. In some embodiments, the electronic device includes a package substrate and a plurality of integrated circuits to be coupled to the package substrate, at least one integrated circuit comprising a topside connector or an edge connector to be coupled to a cable that is to couple to a cable receptacle.

In some embodiments, the package substrate does not include the cable. In addition, the cable receptacle may transmit the data to switch fabric silicon. Furthermore, in some embodiments, the cable is one of a coaxial cable, a micro-coaxial cable, twin-axial cable, or a flexible printed circuit.

EXAMPLE 2

An electronic device that can transmit data is described herein. In some embodiments, the electronic device includes an integrated circuit to be coupled to the package substrate, the integrated circuit to have a topside connector to be coupled to a cable. The electronic device can also include a double-ended cable receptacle that is to electrically couple to at least two connectors that transmit the data from a first agent to a second agent.

In some embodiments, the double-ended cable receptacle transmits the data from the first agent to the second agent using signal lines. Additionally, the connector may be a network interface connector integrated into the cable in some embodiments. The connector can also be a network interface connecter that attaches to the cable through one of a low insertion force connector and a land grid array. In some embodiments, the connector comprises a transition board and a low insertion force connector or a quad small form-factor pluggable connector.

EXAMPLE 3

A system that can transmit data is described herein. In some embodiments, the system includes an integrated circuit to be coupled to a first package substrate, the integrated circuit to have a topside connector to be coupled to a cable and a double-ended cable receptacle that transmits the data from the first package substrate to a second package substrate. The system also includes a backplane printed circuit board comprising switch fabric silicon.

In some embodiments, the double-ended cable receptacle resides within the backplane printed circuit board. In some embodiments, the double-ended cable receptacle enables data transmission between the integrated circuit and switch fabric silicon without a repeater. Additionally, the double-ended cable receptacle may include a sideband signal that transmits data through a sideband opening.

While the present techniques have been described with respect to a limited number of embodiments, those skilled in the art will appreciate numerous modifications and variations therefrom. It is intended that the appended claims cover all such modifications and variations as fall within the true spirit and scope of this present techniques.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present techniques.

A module as used herein refers to any combination of hardware, software, and/or firmware. As an example, a module includes hardware, such as a micro-controller, associated with a non-transitory medium to store code adapted to be executed by the microcontroller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments described herein may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present techniques. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the techniques as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An electronic device to transmit data comprising:
a package substrate; and
a plurality of integrated circuits coupled to the package substrate, at least one integrated circuit comprising a topside connector coupled to a cable receptacle via a first cable, the cable receptacle also coupled to a printed circuit board via a second cable separate from the first cable, the second cable receiving a sideband signal from the printed circuit board, wherein the at least one integrated circuit is connected to a backplane connector through the cable receptacle, and wherein a backplane package substrate enables data transmission between the at least one integrated circuit and a switch fabric silicon without a repeater.

2. The electronic device of claim 1, wherein the package substrate does not include the first cable.

3. The electronic device of claim 1, wherein the cable receptacle transmits data to a switch fabric silicon.

4. The electronic device of claim 1, wherein the first cable is one of a coaxial cable, a micro-coaxial cable, twin-axial cable, or a flexible printed circuit.

5. The electronic device of claim 1, wherein the cable receptacle is a CXP cable receptacle.

6. An electronic device to transmit data comprising:
an integrated circuit coupled to a package substrate, the integrated circuit having a topside connector coupled to a first cable; and
a double-ended cable receptacle that is electrically coupled to the first cable from the topside connector and a second cable separate from the first cable that is electrically coupled to a chassis panel comprising a printed circuit board, the second cable receiving a sideband signal from the printed circuit board, wherein the integrated circuit is connected to a backplane connector through the double-ended cable receptacle, and wherein a backplane package substrate enables data transmission between the integrated circuit and a switch fabric silicon without a repeater.

7. The electronic device of claim 6, wherein the double-ended cable receptacle transmits the data from the integrated circuit to the printed circuit board.

8. The electronic device of claim 6, wherein the topside connector is a network interface connector integrated into the first cable.

9. The electronic device of claim 6, wherein the topside connector is a network interface connector that attaches to the first cable through one of a low insertion force connector and a land grid array.

10. A system to transmit data comprising:
an integrated circuit coupled to a first package substrate, the integrated circuit to have a topside connector coupled to a first cable;
a double-ended cable receptacle coupled to the first cable that is to transmit the data from the topside connector of the integrated circuit of the first package substrate to a chassis panel comprising a printed circuit board, the double-ended cable receptacle also coupled to a second cable separate from the first cable, the second cable receiving a sideband signal from the printed circuit board; and
a backplane printed circuit board comprising a switch fabric silicon, wherein the integrated circuit is connected to a backplane connector through the double-ended cable receptacle, and wherein the backplane printed circuit board enables data transmission between the integrated circuit and the switch fabric silicon without a repeater.

11. The system of claim 10, wherein the double-ended cable receptacle resides within the backplane printed circuit board.

12. The system of claim 10, wherein the first package substrate does not include the first cable.

13. The system of claim 10, wherein the double-ended cable receptacle transmits data to the switch fabric silicon.

14. The system of claim 10, wherein the first cable is one of a coaxial cable, a micro-coaxial cable, a twin-axial cable, or a flexible printed circuit board cable.

15. The system of claim 10, wherein the first cable comprises a connector, wherein the connector is a quad small form-factor pluggable connector.

* * * * *